V. G. ROBISON.
ADJUSTABLE HAME AND TRACE CONNECTOR.
APPLICATION FILED NOV. 9, 1911.
1,068,451.
Patented July 29, 1913.
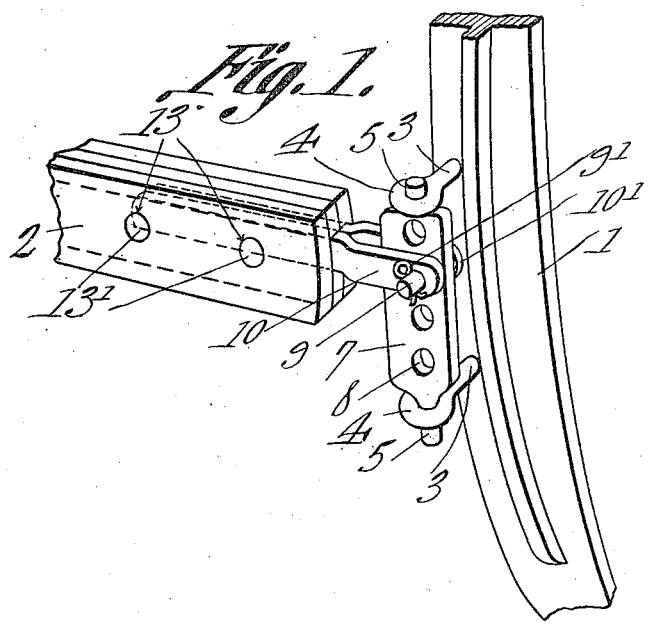
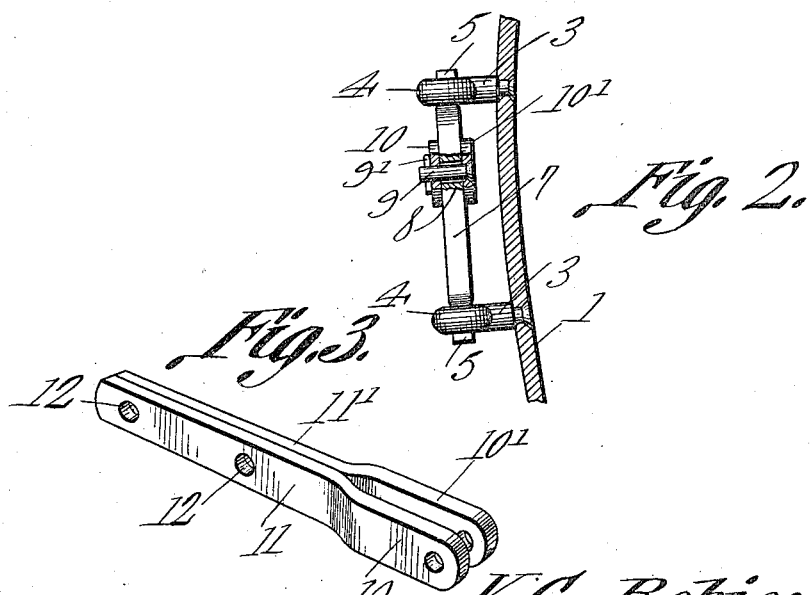
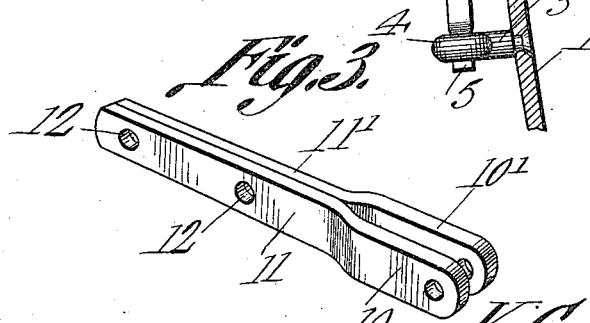
Witnesses
V. G. Robison, Inventor
by C. A. Snow & Co., Attorneys

UNITED STATES PATENT OFFICE.

VERN G. ROBISON, OF RIGA, MICHIGAN.

ADJUSTABLE HAME AND TRACE CONNECTOR.

1,068,451.                    Specification of Letters Patent.         Patented July 29, 1913.

Application filed November 9, 1911. Serial No. 659,454.

*To all whom it may concern:*

Be it known that I, VERN G. ROBISON, a citizen of the United States, residing at Riga, in the county of Lenawee and State of Michigan, have invented a new and useful Adjustable Hame and Trace Connector, of which the following is a specification.

The present invention relates to improvements in adjustable hame and trace connectors, the primary object of the invention being the provision of a connecting device bodily carried by the hame and consisting of a pivotally mounted plate provided with a plurality of apertures therethrough, a pair of connecting members being carried by the forward end of the trace or tug to be disposed upon opposite sides of the said pivoted plate and held in a vertical pivotal position at one of the openings of the said pivotal plate, whereby the line of draft may be placed at different positions upon the hame according to the heights of the draft animals and the positions in which they carry their heads, so that the pressure of the hame and collar upon the shoulders of the draft animal will be uniform and not produce soreness at certain portions where the line of draft would be brought were it not for the adjustability of the connection.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a perspective view of the complete connection in operable relation between a portion of a hame and the forward end of a trace or tug. Fig. 2 is a sectional view taken through the portion of the hame to which the pivotal plate is secured, said pivotal plate being broken away to show the connection of the tug engaging arms thereto. Fig. 3 is a perspective view of the tug engaging arms.

Referring to the drawings, the numeral 1 designates the hame and 2 the forward end of the trace or tug, the hame having connected thereto, by any well known means, in the present instance by riveting, the two studs or pins 3 provided with the horizontally disposed eyes 4.

Disposed to have a pivotal movement between the studs 3 with the reduced terminals 5 thereof pivoted in the eyes 4 of said studs 3, is the vertically disposed draft attaching plate 7 provided with a plurality of apertures 8 therethrough. The apertures 8 are in line with the axis of the plate 7. Adapted to pass through any of one of the apertures 8 is a pin 9 held in place by a cotter 9', so as to retain the spaced terminals 10 and 10' of the tug engaging arms or plates 11 and 11', in the proper relative position to the pivotal plate 7, the said tug engaging arms 11 and 11' being thus pivoted so as to have a vertical swinging movement, while the plate 7 has a horizontal swinging movement. By this means a universal joint is provided between the hame 1 and the tug 2, the apertures 12 of the tug engaging and carrying arms 11 and 11' being alined with apertures 13 for the reception of the rivets 13', whereby the tug ends are secured to said arms, the arms being placed between the layers of the tug as clearly shown in Fig. 1.

By providing the apertures 8 through the body of the draft attaching plate 7 and having the pin 9 fit snugly therein there is no play or jerky motion imparted to the trace during the pull or any slacking upon the pull, and therefore no danger of the pin slipping as would be the case if the forward edge of the plate 7 were slotted or notched. This feature is an important feature in that it holds the forward end of the trace or tug in proper adjusted position at all times.

By this construction of trace connector, it is evident that the pin 9 may be removed and any of the apertures 8 brought into play to regulate the height or adjustment of the trace tug carrying arms 11 and 11', thus bringing the line of draft higher or lower upon the hame 1 between the lugs 3 to accommodate the collar and line of draft to the draft animal, thus bringing the draft line in the proper position so that the collar (not shown), will be brought to bear equally at all points around the neck and upon the shoulders of the animal and thus prevent any soreness at any particular spot as would be the case where the tug connection is made immovable with relation to the hame.

It will be noted that the plate 7 is of such a width that the same is permitted a complete rotary movement without engaging or contacting the hame 1 and that therefore should the apertures 8 be elongated by the wear of the pin 9 thereupon, the plate 7 may be given a half revolution in the eyes 4 to present the unworn side of the aperture of the plate 7 to connect the trace carrying arms 10 thereto. By mounting the plate 7 as shown, between the horizontally disposed eyes 4 of the studs 3, it is evident that said plate has a horizontal swinging or pivotal movement while pivotally connecting the spaced terminals 10 and 10' of the arms 11 and 11' carried by the tug 2, so as to straddle the said connecting plate 7, the tug is permitted a vertical swinging movement, thus providing the pivotal point at 9 and with the eyes 4 a universal joint with an adjustable connection between the horizontally swinging joint and the vertical swinging joint of the connector. This adjustability renders the device exceedingly practical, in that the same may be employed to regulate the height of line of draft, so that animals that carry their heads and necks in different positions, may be accommodated to have the collar fit upon their neck and shoulders to secure the best results and at the same time be comfortable to the said animal.

What is claimed is:

An adjustable hame and trace connector, having two spaced apertured lugs carried by the hame, the apertured ends being projected beyond the face of the hame and in axial alinement, a flat plate having oppositely disposed cylindrical studs journaled in the apertured studs, said plate being of such a width as to be permitted free rotation without contacting the body of the hame, said plate having a plurality of circular apertures through the body thereof, said apertures being alined axially of the plate, two trace carried plates provided with spaced and apertured terminals, the terminals of the trace carried plates being disposed to fit astride the journaled plate, and a cylindrical pin insertible through the apertures of the trace carried plates and one of the alined apertures of the journaled plate to form a locking pivot for the trace carried plates.

In testimony that I claim the foregoing as my own, I have hereto affixed my signature in the presence of two witnesses.

VERN G. ROBISON.

Witnesses:
L. C. KNIGHT,
J. C. IFFLAND, Jr.

Copies of this patent may be obtained for five cents each, by addressing the "Commissioner of Patents, Washington, D. C."